United States Patent [19]

Ogawa

[11] Patent Number: 4,517,466
[45] Date of Patent: May 14, 1985

[54] VACUUM PUMP

[75] Inventor: Hitoshi Ogawa, Himeji, Japan

[73] Assignee: Mitsubishi Denki Kabushiki Kaisha, Tokyo, Japan

[21] Appl. No.: 486,280

[22] PCT Filed: Aug. 18, 1982

[86] PCT No.: PCT/JP82/00323
§ 371 Date: Mar. 24, 1983
§ 102(e) Date: Mar. 24, 1983

[87] PCT Pub. No.: WO83/00668
PCT Pub. Date: Mar. 3, 1983

[30] Foreign Application Priority Data

Aug. 18, 1981 [JP] Japan ............... 56-122894[U]

[51] Int. Cl.³ .................................. F02B 77/00
[52] U.S. Cl. ................... 290/36 R; 123/179 A; 123/179 D; 123/198 C
[58] Field of Search .......... 290/36 R, 52; 310/62, 310/63; 123/179 A, 179 D, 198 C

[56] References Cited

U.S. PATENT DOCUMENTS 1,262,691  4/1918  O'Neill .................. 123/179 D

FOREIGN PATENT DOCUMENTS 114510  10/1978  Japan .

Primary Examiner—William M. Shoop
Assistant Examiner—Shelley Wade
Attorney, Agent, or Firm—Wenderoth, Lind & Ponack

[57] ABSTRACT

A vacuum pump directly driven by a starting motor of an engine which can operate with a constant number of rotations even while the engine is running. The starting motor is shut off when the engine has reached a predetermined speed and then restarted to drive the pump in response to the vacuum in the vacuum tank or pressure accumulating portion of the master bag.

2 Claims, 3 Drawing Figures

VACUUM PUMP

TECHNICAL FIELD

This invention relates to a vacuum pump.

BACKGROUND ART

Vacuum pumps of the type referred to are generally mounted to the rear end portion of the electric generator for motor vehicles and the construction thereof will be described in conjunction with FIGS. 1 and 2.

Reference numeral (1) designates a rear bracket for an electric generator used with a motor vehicle and (2) designates a shaft supported by said rear bracket (1) through a bearing (3) and driven by an engine not shown. Reference numeral (4) designates a rotor A fixed to said shaft (2) through the spline fitting. Reference numeral (5) designates a housing having a inner cylindrical peripheral surface eccentric from the centers of said shaft (2) and said rotor A (4), (6) a plate put between said rear bracket (1) and said housing (5) to constitute a pump operating chamber (7), and (8) a mounting bolt for fixing said housing (5) and said plate (6) to said rear bracket (1). Reference numeral (9) designates vanes radially inserted into said rotor A(4) to be slidable in the diametric direction. Reference numerals (10) and (11) designate packings for keeping the airtightness of junction surfaces between said rear bracket (1) and the plate (6) and between said plate (6) and the housing (5), (12) an oil seal fixed to said bracket (1) and contacted by the periphery of said shaft (2) to keep the airtightness of the pump operating chamber (7), and (13), (14) and (15) a suction port, an exhaust port and an oil supply port which are provided on said housing (5) and connected to a vacuum tank (or a pressure accumulating portion of a master bag), an oil pan and an oil pump respectively, which are not illustrated. Reference numeral (16) designates a rotor B fixed to the shaft (2) to hold a field winding for the electric generator and (17) is a stator for holding an armature winding. Reference numeral (18) designates a front bracket constituting an outer frame of the electric generator with the rear bracket (1), and a bearing (19) is fixed to this front bracket (18) and rotatably journals the shaft (2). Reference numeral (20) designates a pulley fixed to the shaft (2) to receive the transmission of the rotation from the engine.

Regarding the operation, a description will now be made.

First with respect to the vacuum pump, when the rotation of the engine is transmitted to the pulley (20) by a belt to rotate the shaft (2) in the direction of the arrow, the vanes (9) spring outwardly by means of a centrifugal force caused on the vanes to be rotated while sliding along the inner wall of the housing (5), thereby to draw air from within the vacuum tank (or the pressure accumulating portion of the master bag) and exhaust it through the exhaust port (14) to perform the pumping operation. Also, an oil supplied to the interior of the housing (5) through the oil supply port (15) effects the lubrication of a sliding surface between the vanes (9) and the rotor (4) and is exhausted to the oil pan through the exhaust port (14).

With respect to the electric generator, an alternating current is induced on the stator by cutting a magnetic field generated from the rotor B(16) by means of the rotation of the shaft (2). This alternating current is rectified to a direct current which flows into a charging circuit on the side of a car body.

The electric generator for motor vehicles is generally belt-driven by an engine for a motor vehicle to be used with the number of rotations equal to about twice that of the engine in view of the power generation characteristic thereof. Thus regarding the vacuum pump directly connected to the generator, it is also used with the same number of rotations as the generator. For this reason, it is used according to the abrupt acceleration and deceleration from a range of low rotations (about 1000 rpm) to a range of high rotations (about 12000 rpm) and also the vacuum pump is continually being operated during the operation of the engine. Thus, the components constituting the vacuum pump have been previously required to have the durability and shock resistance with respect to the range of high rotations and long service resulting in an expensive device. Also, since the electric generator is driven through the belt, there has been the disadvantage that a vacuum cannot be obtained because the belt is broken to stop the vacuum pump.

DISCLOSURE OF THE INVENTION

According to the present invention, a vacuum pump has been formed by making a starting motor a driving source, and therefore the vacuum pump can be operated with a constant number of rotations. Thus, there is the effect that a vacuum pump inexpensive and still high in reliability is provided because the pump does not require the durability in a range of high rotations such as conventional devices are required to have and also it is driven directly by the motor.

BEST MODE FOR CARRYING OUT THE INVENTION

Figure 1:
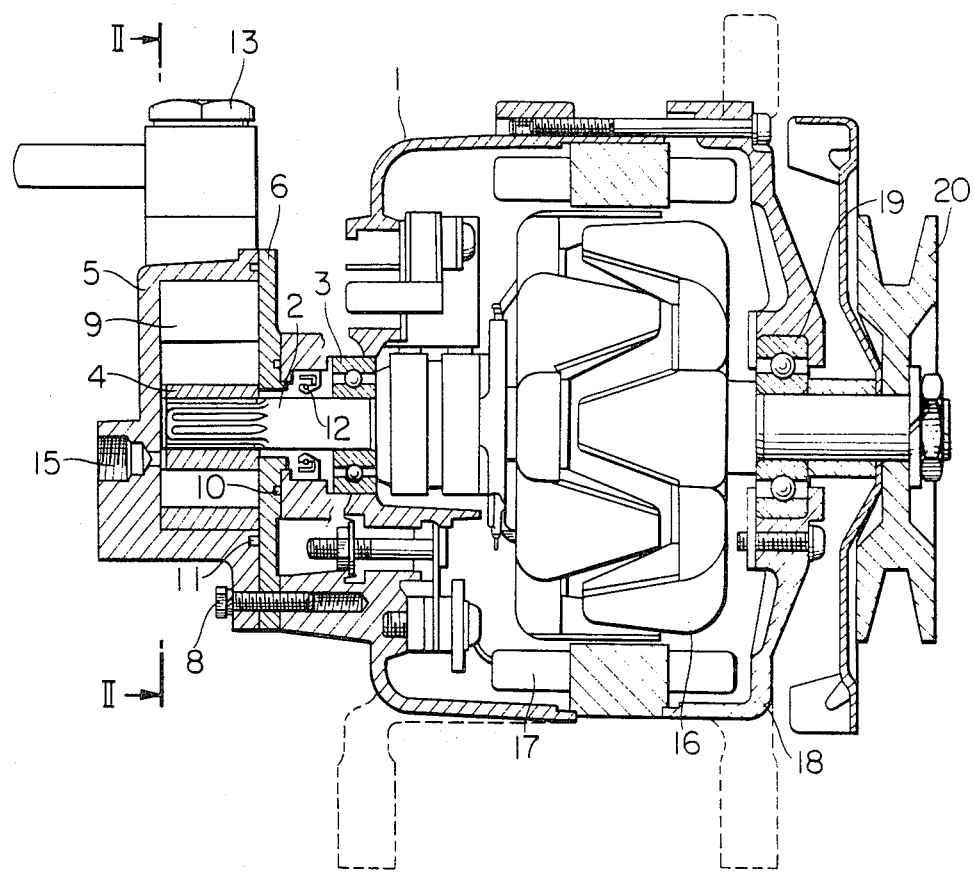
FIG. 1 is a sectional view illustrating a conventional device.
Figure 2:
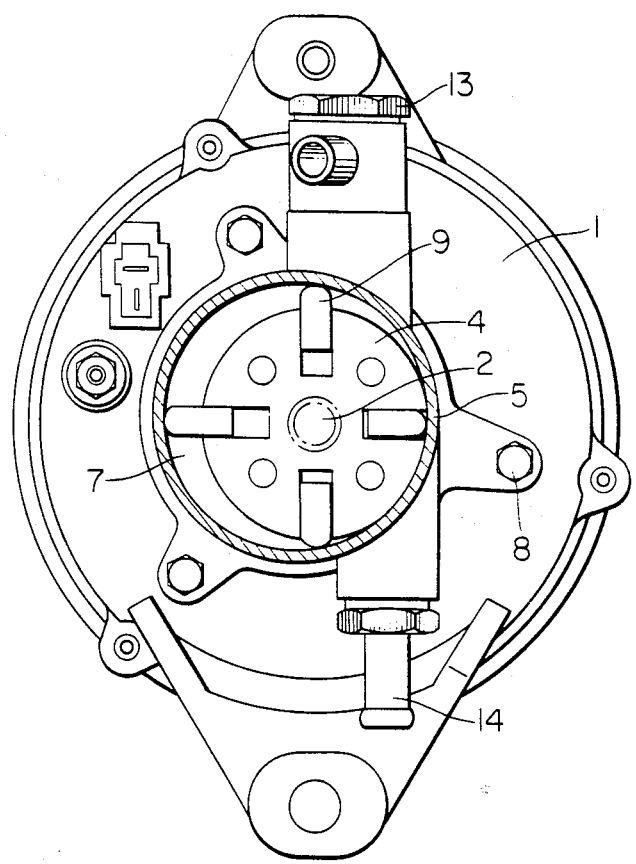
FIG. 2 is a sectional view on the line II—II of FIG. 1.
Figure 3:
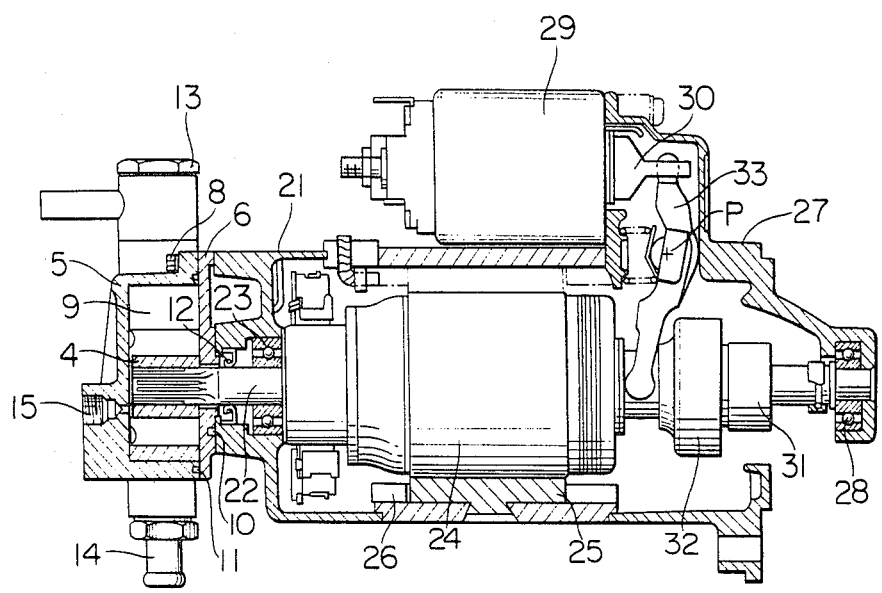
FIG. 3 is a sectional view illustrating one embodiments of the present invention.

One embodiment of the present invention will be described with reference to FIG. 3. Reference numeral (21) designates a rear bracket for a starting motor, and (22) a shaft rotatably journalled by this rear bracket through a bearing (23). Fixed to this shaft (22) is an armature (24). Reference (25) designates a field iron core provided to oppose to this armature in a diametrical direction, and Reference (26) designates a field winding wound on this field iron core. Reference numerial (27) designates front bracket, and a bearing (28) is fixed to this front bracket which rotatably journals said shaft (22). Reference numeral (29) designates an electromagnetic switch fixed to the front bracket (27) and reference numeral (30) designates a plunger which is one of the components constituting this electromagnetic switch. Also, the electromagnetic switch (29) has contacts A and contacts B, not shown. The contacts A are contacts for drawing the plunger (30) in a lefthand direction while the contacts B are contacts opened and closed when the plunger (30) has been moved in the lefthand direction and by a sensor connected to the vacuum tank (or the pressure accumulating portion of the master bag), the sensor being connected to a circuit with the armature (24) and the field winding (26). Reference numeral (31) designates a pinion gear meshing with a ring gear for an engine not shown and reference numeral (32) designates an overrunning clutch integrally assembled into said pinion gear (31) to be slidable with respect to said shaft (22). Reference numeral designates a shift lever connected to the plunger (30) and the overrunning clutch. Reference character P designates a flucrum of the shift lever (33) with the front bracket (27).

During the start of the engine, the contacts A are first closed by a key switch not shown to close an electromagnetic circuit with the electromagnetic switch (29) so that a current draws the plunger 30 in the lefthand direction. Thereby the shift lever connected to the plunger (30) is rotated about the flucrum P to cause the overrunning clutch (32) and the pinion gear (31) to slide in a righthand direction along the shaft 22. The pinion gear (31), having slid, meshes with the ring gear disposed on the engine side. Under these circumstances, due to the contacts B being closed by the lefthand movement of the plunger (30), a current flows through the armature (24) and the field winding (26) to rotate the armature (24). Thereby the pinion gear (31) rotates the ring gear to drive the engine. At that time vacuum pump performs the pumping by an operation similar to that of conventional devices.

When the engine rises, the number of rotations of the engine becomes higher than that of the armature (24). Thus, the overrunning clutch (32) causes the pinion gear (31) to run idle to protect the armature (24), and the contacts A and the contacts B are open to stop the the rotation of the armature (24) and return the pinion gear (31) and the overrunning clutch (32) back to their original positions to complete the start of the engine.

After the start of the engine, a degree of vacuum is sensed by the sensor connected to the vacuum tank (or the pressure accumulating portion of the master bag) and when the degree of vacuum reduces to or below a predetermined constant, only the contacts B are closed to rotate the armature (24) alone to drive the vacuum pump with a constant number of rotations to provide a vacuum. When a degree of vacuum of the vacuum tank (or the pressure accumulating portion of the master bag) is reached, this is sensed by the sensor to open the contacts B to stop the vacuum pump. According to the circumstances, it is also possible to provide the vacuum by closing the contacts B alone to always operate the vacuum pump with the constant number of rotations after the engine has been started.

The rear bracket (21) and the plate (6) are formed of separate members in said embodiment, but a similar effect is presented even by forming them of a single member.

Also, the disclosed embodiment has been described in conjunction with an oil lubrication system vacuum pump, but a similar effect is presented by using a non-lubrication system vacuum pump.

Furthermore, the rotor (4) has been directly fitted onto the shaft (22) in the disclosed embodiment, but a similar effect is obtained by driving the rotor (4) through a coupling interposed between the shaft (22) and the rotor (4).

As described above and according to the present invention, a vacuum pump has been formed by making a starting motor a driving source and therefore the operation can be effected with a constant number of rotations. Vacuum pump is inexpensive and still high in reliability because it does not require a durability in a range of high rotations such as in conventional devices and also it is driven directly by the motor.

INDUSTRIAL APPLICABILITY

The present invention is not limited to an electromagnetic shifting system starting motor but it can be utilized provided simply that a starting motor is provided.

I claim:
1. A vacuum pump arrangement comprising:
   a. an engine starting motor having a rear bracket and a rotary shaft and means for rotating said rotary shaft;
   b. an engine;
   c. means for coupling said rotary shaft to said engine to start said engine when said rotary shaft is rotated by said rotating means;
   d. means for decoupling said shaft and said engine when said engine is started;
   e. a vacuum pump, said vacuum pump including:
   (1) a rotor coupled to said shaft so as to be driven by rotation of said shaft,
   (2) a housing having an inner cylindrical peripheral surface eccentric to the center of said rotor, and having a suction port and an exhaust port,
   (3) a plate between said housing and said bracket closing said housing so as to define an operating compartment within said housing, and
   (4) vanes on said rotor, in said operating compartment, rotatable with said rotor in sliding contact with said inner cylindrical peripheral surface, for pumping a fluid from said suction port to said exhaust port;
   f. means, responsive to running of said engine, for stopping said starting motor;
   g. a vacuum tank and a master bag having a pressure accumulating portion, communicating with said suction port; and
   h. means, responsive to a vacuum in at least one of said vacuum tank and said pressure accumulating portion, for starting said starting motor to drive said vacuum pump.

2. An arrangement as in claim 1, wherein said starting means further comprises means for stopping said starting motor when the vacuum sensed by said starting means reaches a predetermined level.

* * * * *